United States Patent [19]

Cobbs et al.

[11] Patent Number: 4,922,270

[45] Date of Patent: May 1, 1990

[54] INTER PEN OFFSET DETERMINATION AND COMPENSATION IN MULTI-PEN THERMAL INK JET PEN PRINTING SYSTEMS

[75] Inventors: Keith E. Cobbs; Robert D. Haselby; William S. Osborne, all of San Diego, Calif.

[73] Assignee: Hewlett-Packard Company, Palo Alto, Calif.

[21] Appl. No.: 304,980

[22] Filed: Jan. 31, 1989

[51] Int. Cl.$^5$ ............................ G01D 18/00; B41J 3/04
[52] U.S. Cl. .............................. 346/140 R; 346/8.1; 250/222.1
[58] Field of Search ...................... 346/140; 250/222.1

[56] References Cited

U.S. PATENT DOCUMENTS

| | | | |
|---|---|---|---|
| 4,323,905 | 4/1982 | Reitberger | 346/75 |
| 4,509,057 | 4/1985 | Sohl | 346/140 X |
| 4,590,482 | 5/1986 | Hay | 346/140 X |
| 4,675,696 | 6/1987 | Suzuki | 346/140 X |
| 4,709,244 | 11/1987 | Piatt | 346/140 |

Primary Examiner—Joseph W. Hartary
Attorney, Agent, or Firm—Roland I. Griffin

[57] ABSTRACT

Apparatus for determining inter-pen offsets in a multiple pen ink jet printer including a drop detector for measuring flight time of ink drops, an aperture plate disposed in the print media plane, and a carriage position sensor for determining carriage position when ink drop flight time exceeds a predetermined value, which indicates that an ink jet is at the edge of the aperture plate. The sensed carriage positions for the respective pens provides information indicative of inter-pen offset in the scan axis direction. In a further embodiment of the invention, the aperture plate can have a stair-shaped boundary to facilitate the calibration of a plurality of nozzles in one scan. For determination of inter-pen offset in the media scan direction, the aperture includes a comb-like boundary that is utilized to produce the detect/no detect pattern for a nozzle array in each of the pens, whereby the pattern for each of the pens provides information indicative of the offset between pens.

6 Claims, 3 Drawing Sheets

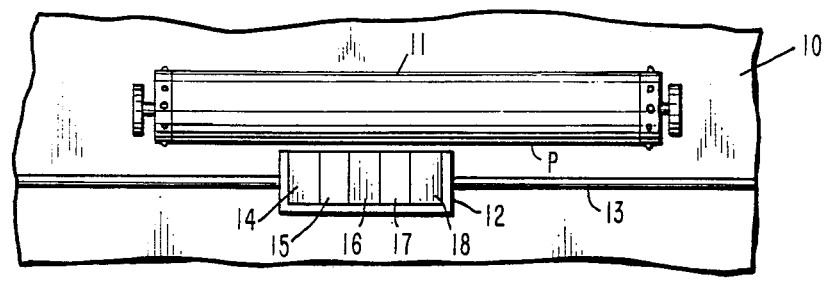
Fig. 1.
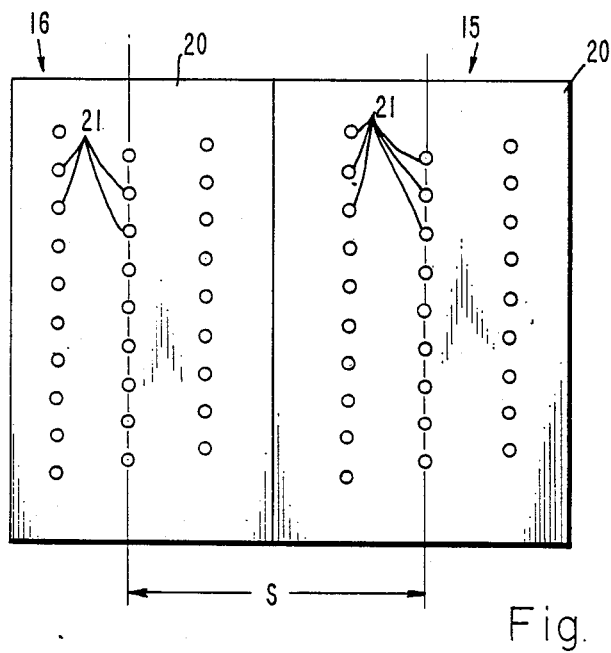
Fig. 2.
Fig. 3.
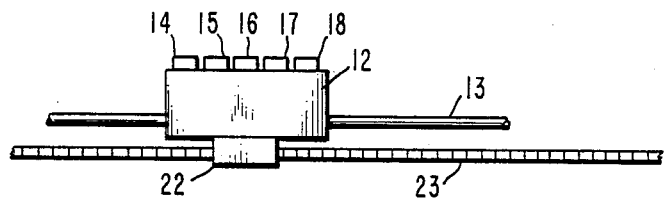

INTER PEN OFFSET DETERMINATION AND COMPENSATION IN MULTI-PEN THERMAL INK JET PEN PRINTING SYSTEMS

BACKGROUND OF THE INVENTION

The present invention relates to ink jet printing apparatus employing a plurality of printing modules. More particularly, the invention relates to calibrating the distance between pens in the pen scan direction (Y), and calibrating the displacement of nozzle arrays relative to each other in the print media index axis (X).

Color ink jet printers are described in the August 1988 issue of the Hewlett-Packard Journal. In addition, the following U.S. Pat. Nos. disclose ink jet printing technology: 4,709,245, M. J. Piatt, "Ink Jet Printer for Cooperatively Printing with a Plurality of Insertable Print/Cartridges"; 4,709,246, M. J. Piatt et al., "Adjustable Print/Cartridge Ink Jet Printer"; 4,709,247, M. J. Piatt et al., "High Resolution, Print/Cartridge Ink Jet Printer"; 4,709,248, M. J. Piatt et al., "Transverse Printing Control System for Multiple Print/Cartridge Printer"; all issued Nov. 24, 1987.

SUMMARY OF THE INVENTION

Prior art systems such as those of Piatt et al., coordinate printing with multiple cartridges by detecting and sorting location data based on measurements made at the orifice plate. It is a feature of the present invention to detect and store location data in terms of measurements of drop position in the nominal plane of the print media rather than at the orifice plate. The term print media means paper, and overhead transparency film, and the like.

Prior art systems such as the Hewlett-Packard Paintjet thermal ink jet printer, for example, provide the three primary colors on a single pen. It is a feature of the present invention to provide a separate pen for each of the primary colors, plus one or more black pens.

Another feature of the invention is that is enables detecting drop position in two axes, not just one, and may also be used to measure pen rotational errors.

A further feature of the invention is that it compensates for nominal drop directionality errors because it measures drop position in the nominal plane of the print media.

Yet another feature is that a real-time drop detector is employed in the present invention.

A still further feature of the present invention is that the position encoder resolution is increased by interpolation.

In accordance with these and other features of the invention, there is provided a color alignment system for multiple pen thermal ink jet printing systems having a capability to measure tolerance-related dot placement errors. This capability allows application of a correction algorithm to the drop fire timing and image data such that the highest possible quality image is produced. As will be more fully understood hereinafter in conjunction with the detailed description and the accompanying drawings, the calibration system measures the distance between pens in the pen scan direction (Y), and measures the displacement of nozzle arrays in the print media index axis direction (X). The system is comprised of three elements; a drop detector, an aperture plate, and a high resolution carriage position sensor. In addition, and if desired, a wiper system may be employed to clean the aperture plate. The aperture plate is located between the pen orifice and the drop detector.

The position sensor or encoder is integral to the pen carriage and provides a constant output of carriage position as the pens are moved past the aperture plate. A change of state is created at the detector as the drop stream passes over the edge of the aperture plate. Correlation of the carriage position signal and state change at the detector provides the measurement of inter-pen spacing in the pen scan direction (Y). In accordance with the invention, two methods of making this measurement are provided. In one method, the pens are fired first at the aperture plate, and then moved to fire at the drop detector. In the second method, the flight time of each drop is measured. Drops are first fired at the drop detector and then the pen is moved toward the aperture plate. As drops impact the aperture plate, their flight times increase in proportion to the percent of the drop impacting the edge of the aperture plate. The measurement is made when the flight time exceeds a predetermined threshold value. The displacement of nozzle arrays in the print media index axis direction (X) is measured by successively positioning each pen adjacent a special pattern provided in the aperture of the aperture plate and firing ink drops through the nozzle array to locate the nozzle pattern.

BRIEF DESCRIPTION OF DRAWINGS

The foregoing and other features of the present invention can be more readily understood with reference to the following detailed description, taken in conjunction with the accompanying drawings, wherein like reference numerals designate like structural elements, and in which:

FIG. 1 is a plan view of a portion of a thermal ink jet printer constructed in accordance with the present invention, shown broken away to illustrate the interior thereof;

FIG. 2 shows an elevation view of adjacent orifice plates greatly magnified illustrating the inter-pen spacing between nozzle arrays;

FIG. 3 is an elevation view of the pen carriage showing the integral linear position encoder and its associated code strip;

DETAILED DESCRIPTION

Figure 4:
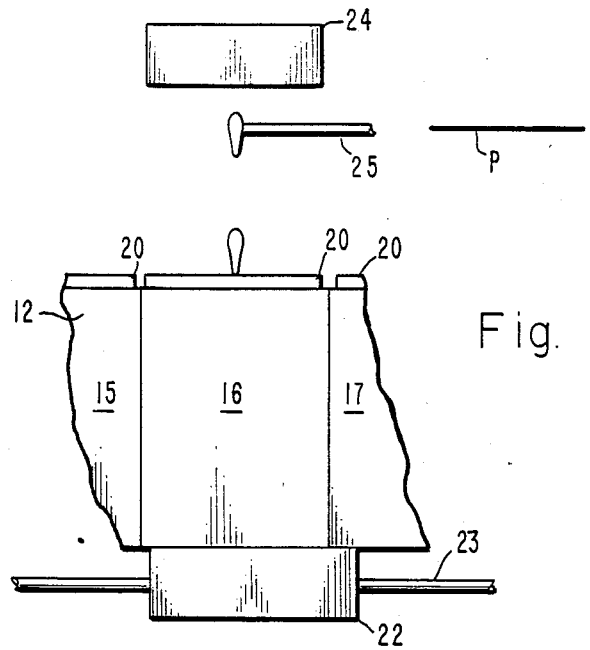
FIG. 4 is a plan view showing a pen firing ink drops past an aperture plate toward a drop detector.

Referring now to FIG. 1, there is shown a plan view of a thermal ink jet printer 10. The printer 10 is shown broken away, and in the interior thereof there may be seen a roll or platen 11 for carrying and indexing the print media, which may be paper, overhead transparency film, or the like. A carriage 12 is mounted for movement back and forth adjacent the print zone P of the platen 11 along a guide rail 13. Mounted within the carriage 12 are five disposable print cartridges or pens 14, 15, 16, 17 and 18. There is no fixed order for the pens 14–18, but for purposes of description, it will be assumed that by way of example, pen 14 prints the color cyan, pen 15 magenta, pen 16 yellow, and pens 17 and 18 print black, although only one black pen 17 may be used, if desired. All five pens 14–18 are thermal ink jet pens employing heating of a thin-film resistor to fire a drop of ink. Thus technology works on the principle of drop on demand. Each pen 14–18 has a plurality of nozzles 21 (FIG. 2), and each nozzle 21 can supply a drop of ink on demand as the pen carriage 12 scans across the print media carried by the platen 11.

FIG. 2 shows an elevation view of adjacent orifice plates 20, greatly magnified, which form a part of each of the pens 14–18. The orifice plates 20 are shown with thirty nozzles 21 for convenience of description, although the actual number of nozzles 21 may be more or less than 30, if desired. Furthermore, the orifice plates 20 may have a different configuration than that shown, for example, long and narrow with the nozzles 21 in two rows instead of three.

This multi-pen printer of the present invention has the advantage of providing faster printing speeds and more pages between replacement of disposable print cartridges or pens 14–18. The printer 10 of the present invention which employs a separate pen for each of the primary colors (pens 14, 15, 16), plus separate black pens (pens 17 and 18), has a print quality which is equal to or better than prior art printers which provide the three primary colors on a single pen.

It has been found that there exists a strong correlation between the alignment of the primary color dots and the quality of the resulting image. In the multi-pen printer of the present invention, the ability to accurately overlay the primary color dots is dependent on manufacturing tolerances in both the pens and the printer. Rather than reduce tolerances by refining the manufacturing processes, the printer of the present invention is provided with the capability to measure tolerance-related dot placement errors. This capability allows application of a correction algorithm to the drop fire timing and image data such that the highest possible quality image is produced.

To calibrate the distances or spacing (S) between pens 14–18 in the pen scan direction (Y), there is provided a linear encoder 22 shown in FIGS. 3 and 4. The linear encoder 22 is a high resolution carriage position sensor with quadrature outputs, the resolution being increased by interpolating between quadrature states. The linear encoder 22 is integral to the pen carriage 12 and provides a constant output of position of the carriage 12 as the pens 14–18 are scanned back and forth along the guide rail 13.

Referring to FIG. 3, the linear encoder 22 which is integral to the carriage 12 employs as a reference a code strip 23. The code strip 23 is a long strip of mylar provided with a marking of opaque lines that are photographically produced, for example. Typically, the code strip 23 may have on the order of 150 lines per inch. The linear encoder 22 may be a linear optical incremental encoder module, such as model HEDS-9200 manufactured by the Optoelectronics Division of Hewlett-Packard Company. A quadrature output of typically 600 to 800 counts per inch is used to operate the motion control system. The reference signal for positioning of ink drops on the print media is generated from a single channel of the encoder 22. This eliminates any possible problem with phase errors in encoder 22.

In prior art devices the position of the orifice plate is detected to determine the distance or spacing (S) between pens in the pen scan direction (Y). In the present invention the position of a drop of ink in the nominal plane of the print media is detected.

In FIG. 4 there is shown a plan view of an arrangement for determining distance between pens in the pen scan direction. To one side of the print zone P, a drop detector 24 is placed in the nominal plane of the print media, and the edge of an aperture plate 25 is placed between the carriage 12 and the drop detector 24. The aperture plate 25 is located to be coplanar with the print zone P. In accordance with one implementation of the invention, while the carriage 12 is moving from right to left, one of the pens 14–18 is fired continuously at the rate of 2000 or more drops per second. At first the drops of ink will be intercepted by the aperture plate 25 and will not reach the drop detector 24. At the instant of first drop detect, the encoder 22 integral with the carriage 12 is read. Similarly, a reading is obtained for each of the remaining pens 14–18. Since the carriage 12 travels at a constant velocity and the pens 14–18 are fired, in turn, at a constant frequency, the distance or spacing "S" between the pens 14–18 in the pen scan direction (Y) is easily determined. Comparison of the carriage positions for all pens 14–18 provides the inter-pen spacing (S). This is the method of firing the pens 14–18 first at the perture plate 25, and the moving them to fire at the drop detector 24.

Figure 5:
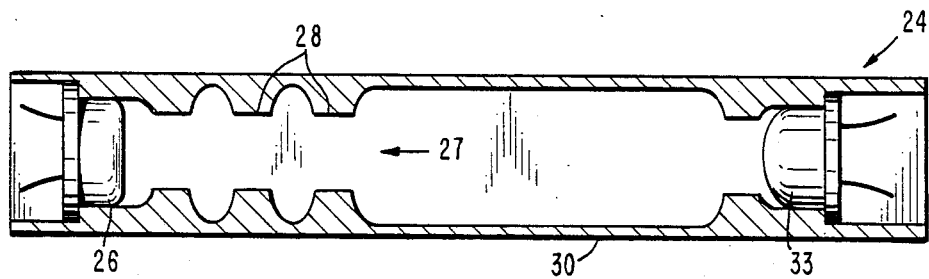
FIG. 5 is another view of the drop detector illustrating the relationship of the component parts thereof.

The construction of the drop detector 24 is illustrated in FIG. 5. A large-area photo diode 26, which may be a Siemens BPX-90 diode, for example, is mounted behind an aperture 27. In the space behind the aperture 27 there are baffles 28 that reduce the effects of ambient light. The nominal cross-section of the detection window 30 typically may be on the order of 2 millimeters by 25 millimeters. The drops remain in the window 30 for the time it takes to traverse the aperture 27, which typically may have a dimension of 1 millimeter.

The illumintion end of the drop detector 24 is provided with another aperture 31, at least one additional baffle 32, and a high-output IR light emitting diode (LED) 33. The LED 33 may be a standard high-output plastic unit such as a model OP295A LED, manufactured by TRW, for example. The illumination level is controlled via a feedback operating point error integrator servo that control the current through the LED 33.

The output of the photo diode 26 is connected to a circuit which includes a comparator having a detection threshold for negative-going signals caused by a drop of ink traversing the detection window 30. The detection threshold tracks any level changes in the signals that are faster than the illumination servo can remove. The comparator output sets a latch which is used as the drop present signal monitored by the microprocessor in the printer. The microprocessor also determines flight time of a drop that traverses the detector window by measuring the time between the firing pulse sent to the thin film resistor and the time of drop detect. This latch is reset each time a drop is fired.

Although an optical drop detector has been employed for used in the abovedescribed embodiment, other drop detectors my also be adapted for use with the present invention. In particular, both piezoelectric and electrostatic drop detectors may be employed in the present invention.

In accordance with a second implementation of the invention, the inter-pen spacing S is measured by driving the carriage 12 at a constant velocity while firing one of the pens 14-18 at a constant drop firing frequency, and measuring the flight time of the drops. Drops are first shot at the drop detector 24 and then the pen is moved from left to right toward the aperture plate 25. As drops impact the aperture plate 25, their flight times increase (due to a loss of translational momentum in the impact) in proportion to the percent of the drop impacting the edge of the aperture plate 25.

As the pens 14-18 scan along from left to right, the system measures the flight time of each drop that traverses the detector window and stores it in memory along with the position of the encoder 22 and the time from the last count. When the flight time of a drop exceeds a predetermined threshold value (indicating that it has impacted the edge of the aperture plate 25), that nozzle is shut off. The microprocessor examines the buffered data, fits a curve through it and determines the location of the pens 14-18. The curve is very repeatable and provides more accurate results than the first method. This second method also has the advantage of minimizing the accumulation of ink on the perture plate 25.

In employing this method, typically the pens 14-18 are scanned at a constant velocity on the order of 0.625 to 0.833 inches per second, and the ink drops are fired at a constant firing frequency, typically on the order of 1 to 1.5 kilohertz.

The accuracy of measurement of inter-pen spacing S is basically dependent on two factors: the accuracy of the linear encoder 22, and the accuracy of the change in state of the drop detector 24 from not detecting to detecting, or vice versa. Measurements have shown that the positional repeatability of the change in state of the drop detector 24 is satisfactory. However, if it should be desired to improve the positional repeatability of the change in state of the drop detector 24, a wiper system may be employed to maintain the aperture plate 25 in an ink-free condition. It has been observed that a bead of ink can develop on the edge of the aperture plate 25 which will cause the effective edge of the aperture plate 25 to move out, which may affect the positional repeatability of the change in state of the drop detector 24.

The resolution of the linear encoder 22 is increased by interpolating between pulses. The measurement of the inter-pen distance or spacing S involves two problems. The carriage 12 is moved at a constant velocity controlled by a servo via the liner encoder 22 and the code strip 23. The first problem in the measurement of inter-pen spacing S is that the very slow speed at which the drop detection must be performed (typically on the order of 0.625 to 0.833 inches per second) necessitates a special servo system configuration. The resolution of the linear encoder 22 is such that one encoder count will be traversed in two milliseconds. The high quality velocity feedback needed for stabilizing the servo loop can be obtained despite the quantization of the encoder feedback by timing between encoder counts.

The second problem is that the resolution of the measurement that is needed is greater than the 0.00125 inch quantization level of the liner encoder 22. This problem is solved by interpolating between encoder counts by means of time measurements. The time elapsed between encoder counts is available from the timing based servo previously described. An additional timer provides the time elapsed from the last encoder count until drop detection is indicated by the drop detector 24. The ratio of these times can be used to interpolate the position of the carriage 12 at the time of the drop detection. Comparison of the positions of the carriage 12 for all pens 14-18 provides the inter-pen spacing (S). Actual tests results have shown that position measurements of 0.0004 inch or better are obtained.

This measurement of the inter-pen spacing (S) is performed automatically to one side of the print zone P, and the result of the measurement is converted to a correction algorithm to electronically compensate the drop fire timing and image data. This enables the multipen thermal ink jet printer 10 of the present invention to accurately overlay the primary color dots, thus resulting in a high quality image being produced.

Figure 6:
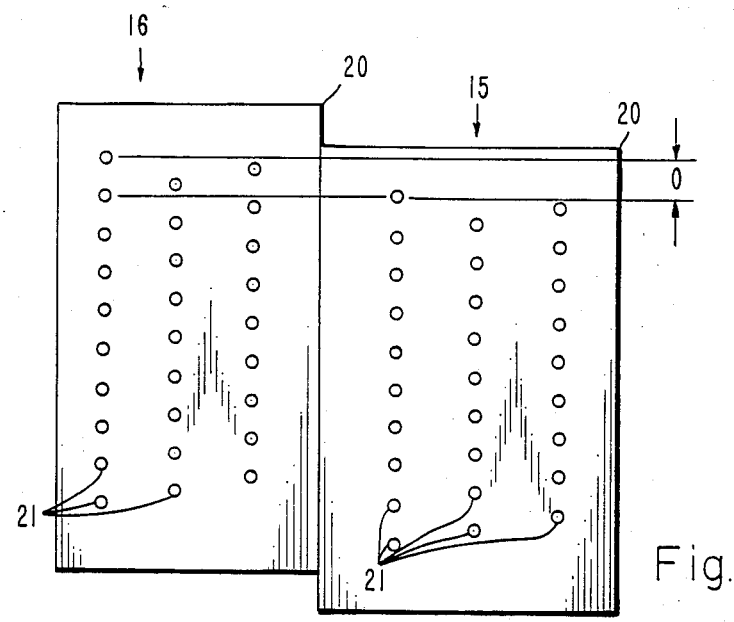
FIG. 6 is an elevation view of adjacent orifice plates greatly magnified illustrating the offset between nozzle arrays.

As is well known, the cartridges or pens 14-18 are replaceable and are held in place by a latch mechanism and by mechanical registration surfaces. The repeatability of registration of the pens 14-18 to the carriage 12 directly affects the print quality. The body of the print cartridges or pens 14-18 has some uncertainty in dimension. Discrepancies in alignment of the pens 14-18 may result in offsets O or displacements of nozzle array relative to each other in the print media index axis (X) as shown in FIG. 6. X-axis measurements are made by successively positioning each one of the pens 14-18 adjacent a special pattern provided in the aperture plate 25 and firing each nozzle 21 to determine the location of the nozzle pattern.

Figure 7:
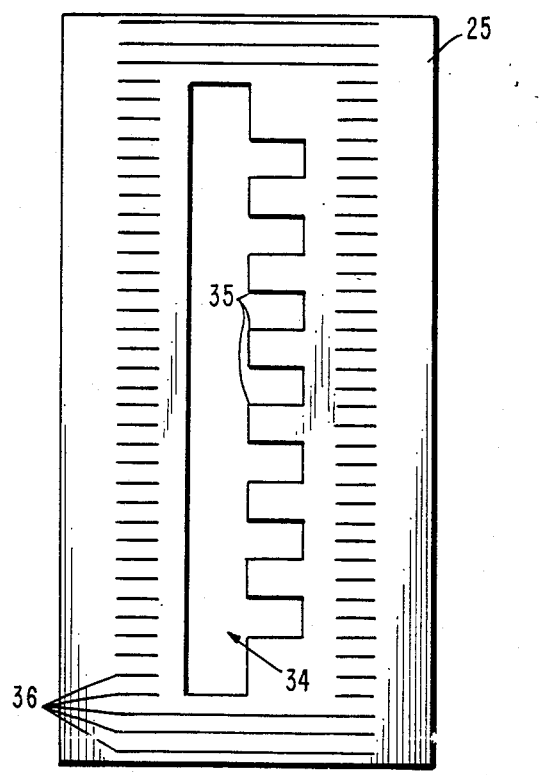
FIG. 7 is an elevation view of an aperture plate greatly magnified to show the construction thereof, and especially the special pattern therein for calibrating pen offsets.

Referring now to FIG. 7, a precision etched aperture plate 25 is provided with an opening 34 having teeth 35 disposed in a special vernier comb-like pattern. Surrounding the opening 34 in the aperture plate 25 are a plurality of ink drain slots 36. As indicated in FIG. 4, the pens 14-18 are individually positioned adjacent the aperture plate 25, and each nozzle 21 is fired toward the drop detector 24. Some of the drops impact the teeth 35 of the comb-like pattern and are not detected by the drop detector 24. Others pass through the opening 34 between the teeth 35 and are detected by the drop detector 24. This information is then mapped into the known position of each nozzle 21 to create a pattern of detect/no detect for each of the pens 14-18. The patterns from each of the pens 14-18 are then compared to determine the relative offsets (O) from pen-to-pen. If two of the pens 14-18 are determined to be out of alignemtnt by more than one-half a dot row, the image data is shifted up or down in the nozzle arrays to produce the optimum alignment. Note that by doing so, nozzles 21 at the ends of the arrays may have to be sacrificed. That is, they will not be usable.

Figure 8:
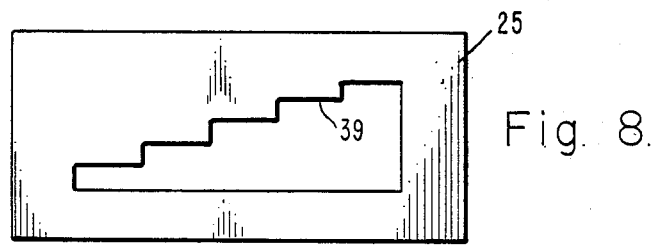
FIG. 8 illustrates an aperture plate having a pattern therein which permits the simultaneous calibration of a plurality of nozzles.

FIG. 8 illustrates an alternative aperture plte 25' having an aperture pattern 39 therein that permits the simultaneous calibration of a plurality of nozzles 21. The second pattern 39 has a stair-step shape such that five nozzles 21, for example, can be simultaneously calibrated. It should be clear that alternative shapes which implement the results of the stair-stepped opening may be readily designed by those skilled in the art. The width of each of the steps is about 0.5 millimeters and the distance between steps is also about 0.5 millimeters.

The algorithm is a detect/no detect pattern generated from each of the pens $14 \propto 18$ to determine relative pen-to-pen offsets (O). This algorithm for the pen alignment in the print media index axis (X) is employed as a correction algorithm to electronically compensate the drop fire timing and image data. This enables the multipen thermal ink jet printer 10 of the present invention to accurately overlay the primary color dots, thus resulting in a high quality image being produced.

Thus, there has been described inter-pen offset determination and compensation in multi-pen thermal ink jet pen printing systems. It will be seen that the printer of the present invention measures drop location data in the nominal plane of the print media rather than at the orifice plate. It will be seen that the printer of the present invention detects drop position both in X and Y axes, not in just one axis. Also, it will be seen that the printer of the present invention compensates for directionality errors because it measures drop position in the nominal plane of the print media.

It is to be understood tht the above-described embodiments of the invention are merely illustrative of the many possible specific embodimenta which represent applications of the principles of the present invention. Numerous and varied other arrangements can be readily devised in accordance with these principles by those skilled in the art without departing from the scope of the invention. In particular, both piezoelectric and electrostatic drop detectors may be employed in the present invention.

What is claimed is:

1. Apparatus for providing inter-pen offset determination and compensation in a multi-pen thermal ink jet printer, said apparatus comprising:
    (a) drop detector means for measuring the time of flight of ink drops between a selected pen and the detector means;
    (b) an aperture plate disposed at the print media plane; and
    (c) high resolution carriage position sensor means for determining carriage location when the time of flight exceeds a predetermined threshold value, whereby the sensed carriage positions for respective pens provides information indicative of inter-pen offset.

2. Apparatus for providing inter-pen offset determination and compensation in a multi-pen thermal ink jet printer, said apparatus comprising:
    (a) optical drop detector means for measuring the time of flight of ink drops between a selected pen and the detector means;
    (b) an aperature plate disposed at the print media plane; and
    (c) high resolution carriage position sensor means for determining carriage location when the time of flight exceeds a predetermined threshold value, whereby the sensed carriage positions for respective pens provides information indicative of inter-pen offset.

3. The apparatus of claim 2 which further comprises: interpolation means coupled to the carriage position sensor means and drop detector means for interpolating the position of the carriage at the time of drop detection.

4. In a multi-pen thermal ink jet printer having movable carriage containing a plurality of pens, a registration calibration system comprising:
    (a) an optical drop detector for measuring flight time of drops of ink;
    (b) an aperture plate interposed between the pens and the drop detector for providing a precision location reference, and
    (c) high resolution carriage position sensor means integral with the carriage for indicating the position of the carriage at the insant the flight time of a drop of ink exceeds a predetermined threshold value as measured by the optical drop detector, whereby the sensed carriage positions for respective pens provides information indicative of inter-pen offset.

5. The apparatus of claim 4 wherein the aperture plate further comprises a stair-shaped aperture pattern disposed in the aperture plate, whereby a plurality of nozzles can be calibrated simultaneously.

6. In a multi-pen thermal ink jet printer, a method for determining relative offset between pens, said method comprising the steps of:
    (a) positioning each pen over a vernier comb-like pattern in an aperture plate interposed between the pens and an optical drop detector;
    (b) firing each nozzle so that some of the drops impact the comb pattern and are not detected, while others pass through the comb pattern and are detected, creating a detect/no detect pattern for each pen; and
    (c) comparing the patterns from each pen to determine the relative offsets from pen to pen.

* * * * *